Sept. 18, 1928.  
J. W. WHITE  
1,684,652  
AXLE AND BEARING THEREFOR  
Filed April 17, 1922
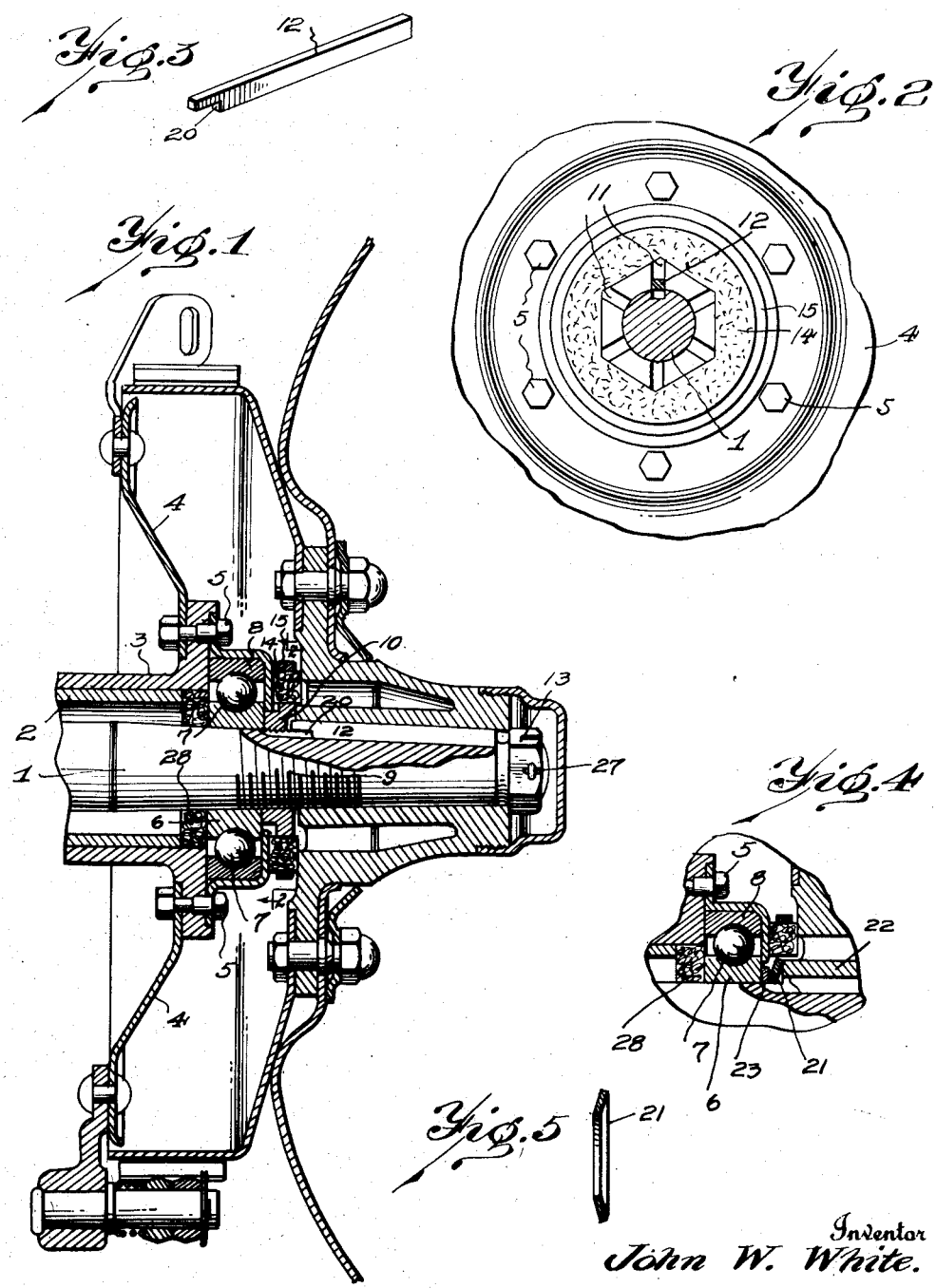
Inventor  
John W. White.
By  [signature]
Attorney Patented Sept. 18, 1928.

1,684,652

UNITED STATES PATENT OFFICE.

JOHN WILLIAM WHITE, OF DETROIT, MICHIGAN.

AXLE AND BEARING THEREFOR.

Application filed April 17, 1922. Serial No. 554,074.

There are three general types of axle construction now in use on motor vehicles, namely, semifloating, three-quarters floating and full floating axles. Of these three designs, experience has taught that the semifloating is the least expensive construction of the three but difficulty has been experienced in the manufacture of this type of axle because of the additional expense necessary when the semifloating construction is used in the type of bearing and hub construction which it has been necessary to use in conjunction therewith.

It is the prime object of my invention to provide means whereby the semifloating construction of axle may be used without incurring the additional expense heretofore necessary in the construction of the bearing and hub portions thereof.

It is a further object of my invention to provide an axle having a continuous taper at its outer end and an anti-friction bearing, the raceway of which is formed with a continuous taper on its inner periphery adapted to conform with the taper on the axle shaft.

It is a further object of my invention to provide a suitable oil retainer of compressible material held in position between the inner race of the said bearing and the housing receptacle for the axle shaft.

With these and other objects in view, my invention consists in the arrangement, combination and construction of the various parts of my improved device as described in the specification, claimed in my claim and shown in the accompanying drawings in which:

Fig. 1 is a central sectional view of the end of an axle shaft with the bearings and hub attached thereto.

Fig. 2 is a sectional view taken on line 2—2 of Fig. 1.

Fig. 3 is a perspective view of a key used in my improved device.

Fig. 4 is a view similar to Fig. 1 showing a modified form of retaining means for the bearing.

Fig. 5 is a section of a portion of the retaining ring.

In the construction of my improved device I have shown an axle shaft 1, having a continuous taper on its outer end as is shown in Fig. 1 of the drawings. I have also shown an axle housing 2 and a housing flange 3, to which latter a portion of the brake drum 4 is secured by means of bolts 5.

Disposed on the tapered portion of the axle 1 is a ball bearing consisting of an inner race 6, which is tapered to conform to the taper on the axle shaft 1, balls 7 and an outer race 8. Also disposed upon axle shaft 1 and abutting against the inner side of the inner race 6 is a ring 28 of compressible material such as felt, which is adapted to act as an oil retainer and to feed oil between the inner and outer raceways to the balls.

The axle shaft 1 is screw threaded as at 9 and a nut 10 is adapted to be screwed thereon against the inner race 6 so as to prevent the outward displacement thereof. The nut 10 has a series of slots 11 therein adapted to receive a key 12 which is disposed within a slot on the axle shaft 1 and held from longitudinal displacement by means of a nut 13 secured on the end of the axle shaft by a cotter pin 27, or other suitable means, thus securely locking the nut 10 in position against the inner race 6.

The key 12, a perspective view of which is shown in Fig. 3, is merely a small steel bar having four equal rectangular sides half of one end of which is cut parallel to the sides as shown at 20. The groove in the axle is therefore capable of receiving the key no matter which side it is placed upon, but this is determined by the position of the groove with reference to the slot 11 in the nut shown in Fig. 2. That is, if the groove registers exactly with one of the slots 11 when the nut is tightened to its farthest point on the axle the key fitting into the groove will also enter the slot no matter which side is placed upon but if when the nut has been tightened the slot is slightly to one side or the other of the groove the key can be turned upon the appropriate side and the narrower edge of the projecting portion thereof inserted into the slot thus permitting the tightest possible connection of the nut on the axle without the surrender of the key locking arrangement.

Disposed around the nut 10 is a packing washer 14 held thereon by a clamping ring 15, or, as shown in the modified construction, the washer 14 may be disposed over the washer 21.

I have shown a modified form of bearing retainer in Fig. 4, which consists of a flared washer 21 disposed around the axle shaft 1 and disposed between the hub 22 and the inner race 6 of the bearing. A washer 23 may be disposed around the shaft and between the washer 21 and the race 6 if desired. The washer 21, being flared, is capable of being sprung or collapsed and thus will readily adjust or absorb the mechanical tolerances between the hub and the bearing.

It will be apparent from the above description that the axle shaft is not provided with a shoulder against which the bearing is held but is made with a continuous taper so that in the construction of the same, a lesser amount of material is required because there is no up-setting to be done and all that is required is that the axle shaft be machined with a tapered end. The bearing is fitted securely on the shaft by reason of the tapered inner raceway setting snugly on the tapered end of the shaft.

It will also be noted that a novel oil retainer is provided and that novel means for securing the bearing against outward displacement is shown.

It is obvious that various changes may be made in the arrangement, combination and construction of the various parts of my improved device without departing from the spirit of my invention and it is my intention to cover by my claim such changes as may be reasonably included within the scope thereof.

What I claim is:

In combination, an axle shaft having a tapered portion, a bearing having a tapered inner race ring adapted to fit over said tapered portion and to be held against movement in one direction on said shaft by said tapered portion, a hub on said shaft and a compressible member rigidly held between said hub and said bearing to hold said bearing against movement on said shaft in the opposite direction.

JOHN WILLIAM WHITE.